US005822280A

United States Patent [19]

Haas

[11] Patent Number: 5,822,280

[45] Date of Patent: Oct. 13, 1998

[54] LONG TERM RAPID COLOR CHANGING TIME INDICATOR EMPLOYING DYE ABSORBING LAYER

[75] Inventor: David J. Haas, Suffern, N.Y.

[73] Assignee: Temtec, Inc., Suffern, N.Y.

[21] Appl. No.: 642,914

[22] Filed: May 6, 1996

[51] Int. Cl.[6] .......... G04B 17/00; G01N 31/32

[52] U.S. Cl. .......... 368/327; 116/200

[58] Field of Search .......... 368/327; 116/200

[56] References Cited

U.S. PATENT DOCUMENTS

| | | | |
|---|---|---|---|
| 4,903,254 | 2/1990 | Haas | 368/327 |
| 5,107,470 | 4/1992 | Pedicano et al. | 368/327 |

*Primary Examiner*—Bernard Roskoski
*Attorney, Agent, or Firm*—Michael E. Zall

[57] ABSTRACT

A time indicator is provided that includes a front layer and a back layer, each having an inner and outer surface. The front layer has a display region on its outer surface. An adhesive means is provided on the inner surface of the front or back layer for adhesively attaching the front layer and back layer to each other. An opaque viewing layer is included on the front or back layer and an activation agent is provided on the other layer. One surface of the opaque viewing layer is viewable from the display region when the front and back layers are adhesively attached to each other. A dye that is substantially non-migrating through the opaque viewing layer, overlies the other surface of the opaque viewing layer. When the inner surfaces of the front and back layers are contacted with each other, the adhesive means adhesively attaches the front and back layers to each other and activates the activation agent. The activation agent migrates to the opaque viewing layer in a predetermined period of time to be absorbed therein. Such absorption activates the dye to enable it to migrate through the opaque viewing layer toward the other side causing an indication in the display region that the predetermined amount of time has expired. Optionally, the activation agent contacts the dye to, for example, solubilize the dye to enable it to migrate through the opaque viewing layer.

Preferably, the activating agent is a plasticizer that is absorbed into the polymeric opaque the viewing layer. At a critical concentration of the plasticizer in the viewing layer, the dye is rapidly absorbed into the viewing layer, passing through the viewing layer to the other surface thereof where it becomes visible through the clear display region on, for example, the white background of the viewing layer.

7 Claims, 3 Drawing Sheets

LONG TERM RAPID COLOR CHANGING TIME INDICATOR EMPLOYING DYE ABSORBING LAYER

BACKGROUND OF THE INVENTION

RELATED APPLICATIONS

Related applications are U.S. Ser. No. 07/602,120 filed on Oct. 22, 1990; U.S. Ser. No. 07/771,765 filed on Oct. 4, 1991; U.S. Ser. No. 07/955,469 filed on Oct. 2, 1992; U.S. Ser. No. 08/197,631 filed on Feb. 10, 1994, now U.S. Pat. No. 5,633,835 (3.0-017); U.S. Ser. No. 03/510,762, filed on Aug. 3, 1995, now U.S. Pat. No. 5,602,804 (3.0-019); all to Haas and U.S. Ser. No. 60/04,090 to Frommer, et al filed Sep. 21, 1995 now U.S. Ser. No. 08/718,268 filed on Sep. 20, 1996 (provisional application, 3.0-024).

1. Field of the Invention

This invention relates to a time indicator for indicating the passage of a relatively long predetermined period of time, which indicator shows the passage of such period of time by a rapid and clear change of color.

2. Description of the Related Art

Numerous devices are known which provide, after activation, a visual indication of the passage of a predetermined period of time. Such a time indicator is useful, for example, as a security badge, as an indicator of the length of time a perishable item has been on the wholesaler's or retailer's shelf and for numerous other uses.

A problem that generally exists with such a time indicator is that it gradually changes color over a long period of time and it is difficult to ascertain the actual completion of the time interval, i.e., it is a "grey" time interval. What is required for a long term time indicator is a technology wherein the dye does not begin to appear until the end or near the end of the time interval. Such a time indicator remains unchanged (white or clear) until near the end of the time interval, and then the color (or image) rapidly (or ideally instantaneously) appears. In essence, what is desirable is a time switch (a color-appearing step-function from white to dark), that stays white until the end of the time interval and then produces a step-function, meaning an instantaneous or rapid color change to clearly show that the time interval has ended.

Earlier technologies, are generally useful only for short time intervals such as days or weeks. They are not useful for longer time intervals (such as months) because the color change occurs by dye diffusion that begins upon activation. Even though the dye may be very slow in migrating to become visible to the viewer, it is difficult for the observer to identify and determine exactly when the image or color indicates that the predetermined time interval has elapsed. The time interval for the image appearance, from white to colored due to the dye migration (say 10–20% tint) is proportional to the predetermined time for which the time indicator has been designed. Thus, for example, in a three month indicator, the time indicator stays pure white for about a month, after which, the indicator starts to change color. After about three months, the observer sees a definite color change of, say 10–20% tint. During the time interval between one and three months, the time indicator is in a "grey area", i.e., "The Grey Time", between expired and unexpired subject to interpretation by the viewer. This lack of a sharp transition time is the problem with known simple dye diffusion systems and indicators.

More specifically, many of the known time indicators, which are generally short term time indicators, are based on the gradual migration of ink from one substrate through another substrate, i.e. in a path perpendicular to the surface of the substrate. After the ink migrates through the substrate (s) it is viewed on a display surface to thereby indicate that the predetermined time period has elapsed.

U.S. Pat. No. 4,903,254 to Haas describes a time indicator comprising a number of layers that are adhered together. The indicator has a front part and a rear part. The rear part includes an ink film layer upon a backup layer. At issuance, the front part and rear part are adhered together and the ink migrates from the rear part into the front part.

U.S. Pat. No. 5,364,132 Haas et al. describes a reusable self-expiring security identification badge. When the badge is issued, the inked substrate is attached to the base substrate, the inked substrate covering the void indicia area. The overlay substrate is then placed over and attached with the soluble ink of the ink substrate. The ink dissolver of the overlay substrate contacts and co-acts with the soluble ink of the inked substrate to dissolve the ink and allow the ink to migrate through to the overlay substrate to the display surface, where it can be visually perceived, in a preselected time interval.

U.S. Pat. No. 3,520,124 to Myers, describes a parked car time indicator. The device includes a first sheet having a first reactant and a second sheet having a second reactant and a release sheet which is peeled away to permit contact of the first sheet with the second sheet. Such contact begins a reaction which extends over a selected time interval and terminates with a color change of the device.

U.S. Pat. No. 4,154,107 to Giezen et al. describes a time temperature indicating device having an indicator layer and a signaling component which when in contact with the indicating layer causes the indicator layer to undergo a visually perceptible change.

U.S. Pat. No. 4,212,153 to Kydonieus et al. describes a laminated indicator which changes in a visually perceptible mode with the passage of time. The indicator comprises at least two layers, whereby the molecular migration of an agent in an interior layer to the outermost surface of the exterior layer causes a change which is visually perceptible.

U.S. Pat. No. 5,045,283 to Patel describes a device comprising an activator tape which includes an activator composition and an indicating tape which includes an indicator composition. The tapes are adhesively bound together to form a wedge-shaped composite matrix. The activating composition diffuses through the increasingly thicker composite matrix to contact the indicating composition to produce a visually observable color change at the temperature being monitored. The color change appears as a moving boundary at the color/non-color interface which moves transversely along the length of the device toward the thicker end.

U.S. Pat. No. 5,107,470 to Pedicano describes a quick acting indicator comprising a migrating ink that migrates through an opaque layer to display a message. Upon removal of a release paper, a coated indicator portion is brought into contact with a printed base portion, and a printed message migrates through a noncuring layer to display the printed message.

U.S. Pat. No. 5,317,980 to Muller et al. describes a time indicator comprising chemical substances separated by a barrier. When the barrier is corroded or removed the chemicals act to cause a visible color change.

U.S. Pat. No. 5,364,132 to Haas et al. describes a reusable self-expiring security identification badge. When the badge is issued, the inked substrate is attached to the base substrate, the inked substrate covering the void indicia area. The overlay substrate is then placed over and attached with the soluble ink of the ink substrate. The ink dissolver of the overlay substrate contacts and co-acts with the soluble ink of the inked substrate to dissolve the ink and allow the ink to migrate through to the overlay substrate to the display surface, where it can be visually perceived, in a preselected time interval.

U.S. Pat. No. 5,446,705 to Haas et al describes a time indicator that changes color or produces an image or information after a specific time interval. The time indicator includes a base with color dye deposited on a first surface; and a substrate having an adhesive on a first surface thereof, the adhesive positioned at discrete locations on the first surface of the substrate. When the substrate and the base are put into adhesive contact with each other, the adhesive contacts and coacts with the colored dye to dissolve the dye and permit the dye to migrate through the adhesive to cause a color change visible through the substrate. The discrete adhesive inhibits lateral migration of the dye to preserve the image or information of the dye in a clear and/or understandable condition.

Other known time indicators are based on the migration of liquids or jelly through wicks to indicate the passage of time.

For example, U.S. Pat. Nos. 3,954,011 and 3,962,920 to Manske describe a time indicating device which includes a porous fluid-carrying pad, a wick material and an indicator means, whereby the progress of fluid along the wick material can be visibly indicated and used to measure the passage of time, the exposure to a given minimum temperature or time-temperature relationship. U.S. Pat. No. 4,028,876 to Delatorre describes an apparatus for visually indicating elapsed time by a color change which comprises a transparent flexible container having a rupturable sealed capsule therein containing a chromophoric compound. The capsule when ruptured permeates into another capsule contained within the container to combine with another chromophoric compound to form a colored body after the predetermined time has elapsed. U.S. Pat. No. 4,229,813 to Lilly et al. describes a time indicator which utilizes an ampule reservoir of silicon oil which, after crushing of the ampule, releases the silicon oil which is slowly absorbed onto and moves up a porous strip at a rate which is a function of time. One side of the strip is printed with an oil soluble ink, while the other side is unprinted. The printed side of the strip is laminated to an unprinted strip. As the silicon oil moves up the strip, the oil contacts the ink causing a dye in the ink to migrate from the printed side to the unprinted side, thus providing a measurable color front moving up the strip.

U.S. Pat. No. 4,382,700 to Youngren describes an indicator which contains a capsule of mineral jelly which is in contact with a wick, such that the mineral jelly diffuses into the wick in accordance with the changes in ambient temperature over a period of time.

U.S. Pat. Nos. 4,292,916 and 4,408,557 to Bradley et al. describe, in several embodiments, a time indicator wherein a migrating carrier mixture is caused to flow by rupturing or depressing a capsule. The carrier mixture contacts an absorptive layer and migrates along the absorptive layer. The progress of this migration can be observed.

U.S. Pat. No. 4,432,656 to Allmendinger describes a time/temperature integrator for indicating the history of a deep frozen product through diffusion of water along a cellulose wick.

U.S. Pat. No. 4,629,330 to Nichols describes a color change indicator of time and temperature. The device includes a reservoir of liquid having a predetermined index of refraction and a rate of evaporation. The liquid is covered by an opacifying layer of microporous material. The opacifying layer has an index of refraction approximately the same as that of a liquid and has an open cell network of pores for absorbing liquid from the reservoir. The layer is in a first radiation scattering condition when the liquid occupies the layer and after a specified period of time in a second scattering condition when the liquid is depleted from the layer.

U.S. Pat. No. 4,643,122 to Seybold describes a diffusion controlled security tag comprising a carrier containing a solution of a compound which changes color upon diffusion or evaporation of the solvent. The carrier is enveloped in a barrier film which controls the rate of diffusion/evaporation of the solvent from the carrier, such that a change in color of the carrier indicates undesirable storage or product tampering.

U.S. Pat. No. 5,058,088 to Haas describes a timing indicator type badge, label or display wherein the relative amount of time that has elapsed from the initial activation of the timing indicator can be easily determined by the progression of a visually perceptible change in color along different areas of the timing indicator. This timing indicator comprises a clear self-adhesive film which is placed over a printed substrate in order to activate the timing indicator. The printed substrate includes a migrating or soluble ink which migrates along the substrate to produce a visual color change.

PCT/AU90/00433 to Tothill et al. discloses a timer comprising a lamination containing a piece of porous wick material and a reservoir of liquid. The reservoir of liquid soaks into the porous wick to create a visible trace of the liquid on the porous wick. A face part of the lamination is transparent so that the visible trace can be seen.

U.S. Pat. No. 3,243,303 to Johnson discloses a temperature monitor employing a flowable aqueous composition containing dispersed polyvinyl acetate as a flow retardant. The fluid carrier is impregnated with a fluid composition which includes a coloring material. Initially the fluid composition is immobilized by freezing. The composition is absorbed by an absorbent layer when it melts or thaws. An impermeable layer serves as a barrier but permits the fluid carrier to pass around the ends thereof to reach an indicating area. A masking layer obscures the absorbent layer and the color change taking place therein until the fluid reaches a central transverse opening in the masking layer, which opening registers with the indicating layer.

U.S. Pat. No. 3,046,786 to Tessem discloses a condition responsive device arranged to indicate the extent of exposure above a certain minimum temperature for use in connection with frozen foods. The device includes a galvanic cell parallel to a porous medium impregnated with an electrolyte and which includes an indicator, such as phenolphthalein, which has one color in the presence of the electrolyte and which will change color on electrolytic action that is temperature dependant.

U.S. Pat. No. 2,896,568 to Pryor et al. discloses a temperature indicating device comprising substances introduced in liquid form into wells and frozen in situ, which substances melt and migrate out of the wells as a result of gravity or capillaries and may be detected by observation.

Other indicators in the prior art rely primarily upon chemical reactions to cause a visually perceptible change over a desired time period rather than the migration of fluids or compounds. These include, for example:

U.S. Pat. No. 2,337,534 to Barber describes a magazine page exposure time indicator including a photosensitive paper sheet mounted on a magazine page, and a developed photographic film sheet having a series of adjacent portions of varying density mounted over the photosensitive paper sheet.

U.S. Pat. No. 3,018,611 to Biritz describes a time indicator including an oxygen reactive material which reacts and changes color upon exposure to oxygen.

U.S. Pat. No. 3,480,402 to Jackson describes a time indicator formed of an absorbent carrier having absorbed thereon at least one chemical compound which changes color upon exposure to oxygen.

U.S. Pat. No. 3,999,946 to Patel et al. describes a perishable product time-temperature history indicator which includes a substrate for attachment of the indicator to a product. The device includes compositions containing at least two conjugated acetylene groups which exhibit sequences of irreversible color changes at combinations of time and temperature.

U.S. Pat. No. 4,195,058 to Patel describes a device for monitoring time-temperature histories in which a vapor is allowed to permeate through a permeable vapor to contact a liquid polydiacetylene indicator to provide a color response after a predetermined period of time.

U.S. Pat. No. 4,212,393 to Lenkoff describes "magic" pictures printed with a water soluble ink including therein one or more latent water soluble coloring materials which may be printed in a pattern of dots. When the soluble imprints of ink are contacted by a felt tip pen, the water in the pen is deposited on the paper and releases the latent coloring material thereby spreading the color along the picture.

U.S. Pat. Nos. 4,432,630, 4,542,982 and 4,779,120 to Haas describe badges with an ambient light sensitive coating thereon which when exposed to ambient light for a specified period of time change to a specified color.

U.S. Pat. Nos. 4,812,053 and 4,917,503 to Bhattacharjee et al. describe, respectively, an oxygen-sensitive and light sensitive perishable product time-temperature indicator.

U.S. Pat. No. 4,987,849 to Sherman discloses a signal device comprising two inks of like colors; an ink that is stable in the presence of light and/or air, and an ink that is sensitive to light and/or air. The stable ink is applied to the device in the form of a message. The sensitive ink is applied as a background to the stable ink to camouflage the message. The device is activated by exposing it to light and/or air, whereby the sensitive ink fades and the message is left behind.

Other possibly related art includes: U.S. Pat. No. 1,454,837 to Smith for tamper evident paper; U.S. Pat. No. 2,088,567 to Ballou for a tamper evident identification card; U.S. Pat. No. 2,780,015 to Whitehead for tamper evident identification cards; U.S. Pat. No. 3,078,182 to Crone, Jr. et al. for a color changing pressure sensitive adhesive indicator tape; U.S. Pat. No. 3,311,084 to Eidenbaum for a pressure sensitive adhesive tape containing markings which change color when subjected to steam sterilizing conditions; U.S. Pat. No. 3,921,318 to Calavetta for medical history cards; U.S. Pat. No. 4,382,063 to Romito et al. for a sterility indicator device having ink spots of chromium chloride that change color over a period of time in the presence of steam; U.S. Pat. No. 4,404,922 to Morane et al. for an aging indicator having at least one closed tube of liquid which, as a function of time and temperature, gradually permeates out of the tube, the level of fluid in the tube being a measure of aging; U.S. Pat. Nos. 4,432,630, 4,542,982 and 4,779,120 to Haas describe badges with an ambient light sensitive coating thereon which when exposed to ambient light for a specified period of time change to a specified color; U.S. Pat. No. 4,573,711 to Hyde for a secure credit card; U.S. Pat. No. 4,643,588 to Postle et al. for a method of monitoring if a stored product has exceeded a predetermined temperature; U.S. Pat. No. 4,646,066 to Baughman for an environmental exposure indicator which includes a tuned electrical circuit; U.S. Pat. No. 4,846,095 to Emslander for a device that indicates a temperature is above/below a critical temperature; U.S. Pat. No. 4,846,502 to Chang et al. for tamper evident documents; U.S. Pat. No. 5,293,648 to Finley for a tag for visually indicating loss of a protective agent; and U.S. Pat. No. 5,378,430 to Nieves et al. for a steam sterilization process monitor.

Although not necessarily prior art, Applicant herein has several pending patent applications relating to time indicators:

U.S. Ser. No. 07/602,120 filed on Oct. 22, 1990, to Haas (3.0-011/CIP) describes a patterned indicator that contains latent information. The indicator includes a first substrate having first and second surfaces, the first surface having a uniform pattern printed with an ink thereon. A second transparent substrate having first and second surfaces is also provided having on the first surface thereof an adhesive activator. The indicator is activated by placement of the first surfaces of the substrates into adhesive contact such that the ink and adhesive activator coact to cause the ink pattern to gradually bleed and blend together to cause a change visually perceptible through the transparent substrate in a selected time interval.

U.S. Ser. No. 07/771,765 filed on Oct. 04, 1991, to Haas (3.0-013) describes a time indicator having a front part and a rear part. The rear part includes an ink pattern layer overlaying a rear support member. The front part includes a transparent front support layer, an opaque adhesive layer capable of dissolving the ink pattern on the rear part, and a front ink display surface. When the front part is contacted with the rear part by applying the opaque adhesive layer onto the ink pattern, the adhesive layer activates the dissolution and migration of ink in a selected time interval from the ink pattern layer, through the opaque adhesive layer to the front ink display surface for viewing through the transparent front support layer.

U.S. Ser. No. 07/955,469 filed on Oct. 02, 1992, to Haas (3.0-015) describes an identification badge having a base coated with an adhesive protected by release paper. The badge is assembled by removing the release paper, placing an identification card into contact with the adhesive, and then attaching a fastener through a slot in the base of the badge. A timing indicator can be incorporated into the badge so as to show the expiration of the badge after a selected period of time.

U.S. Ser. No. 08/197,631 filed on Feb. 10, 1994, now U.S. Pat. No. 5,633,835, to Haas (3.0-017) describes a time indicator that rapidly changes color after a specific time interval. The time indicator includes a base substrate with colored dye deposited on a first surface; a barrier applied over the colored dye; and a substrate having an adhesive on a first surface thereof. The substrate and the base substrate are put into adhesive contact. The adhesive coacts with the barrier to dissolve the barrier in a specified time interval. The adhesive then contacts the colored dye to dissolve the dye and permit the dye to migrate through the adhesive to cause a color change visible through the substrate.

U.S. Ser. No. 03/510,762, filed on Aug. 3, 1995, now U.S. Pat. No. 5,602,804, to Haas (3.0-019) describes a time indicator device having a display layer with a display region therein. A migration layer is provided which overlies and is attached to the display layer. The migration layer has a migration region therein that is in contact with the display region. An activation layer is provided which has an activation region therein that includes a migrating agent capable of migrating laterally through the migration region. When the activation layer overlies the migration layer, the activation region overlies the migration region. The migration region connects the activation region with the display region which is laterally distal from the activation region. In order to activate the device, the activation layer and migration layer are adhesively attached to each other. When the activation layer is contacted with and overlies the migration layer, the activation region contacts the migration region. Upon contact the migrating agent is activated to migrate laterally from the activation region through the migrating region to the display region in a predetermined amount of time to cause an indication in the display region that the predetermined amount of time has elapsed. The device may have a plurality of display regions, activation regions and/or migration regions to provide a means for adjusting the predetermined time, adjusting for environmental conditions and to provide a plurality of elapsed times.

U.S. Ser. No. 60/04,090 to Frommer, et al filed Sep. 21, 1995 (provisional application, 3.0(PROV)-024) now U.S. Ser. No. 08/718,268 filed on Sept. 20, 1996 describes an indicator badge and system for electrically monitoring identification of persons. The badge of the system includes a substrate with a metallic film or a metal foil disposed thereon that is oxidized or chemically depleted to (I) cause a color, reflectivity or opacity change, (ii) show an underlying security symbol or pattern, i.e. the color red or "void", (iii) change the electromagnetic properties of the badge to indicate whether the badge is valid or expired. The elements of the badge are kept separate from each other until the time of activation, at which time they are brought together or laminated to produce a slow change in the metallized film to bring about the indicator stage.

Most of these devices gradually change color over a period of time and involve, at best, a guess or interpretation as to how much time has elapsed. When this uncertainty is combined with the possible variations in temperature, humidity, etc. that may exist in the environment of the time indicator and effect its reliability, the viewer has very little confidence that he or she is close to the expiration time of the device.

OBJECTS AND SUMMARY OF THE INVENTION

It is an object of this invention to provide an improved time indicator.

It is another object of this invention to provide an improved long term time indicator which provides an immediate and clear indication that a predetermined time period has elapsed.

It is a further object of this invention to provide a low cost, easy to read time indicator.

It is still another object of this invention to provide a time indicator which is easy to activate.

It is another object of this invention to provide a time indicator which is easy to manufacture and has no liquids therein which can spill, splatter or stain.

Yet another object of this invention is to provide a time indicator which is inexpensive, simple to construct and can clearly, relatively accurately and quickly indicate the lapse of a selected period of time.

It is still a further object of this invention to provide a time indicator for accurately indicating the passage of a long period of time, including months and even years.

It is yet another object of the present invention to provide a time indicator in which the dye cannot be seen and/or does not start migrating until the end of the predetermined period of time.

It is still another object of this invention to provide a time indicator that remains unchanged until near the end of the predetermined time interval.

It is a further object of the present invention to provide a time indicator that separates the timing of the indicator from the color change of the indicator.

All of the aforedescribed objects are achieved by the time indicator of this invention.

A time indicator is provided that includes a front layer and a back layer, each having an inner and outer surface. The front layer has a display region on its outer surface. An adhesive means is provided on the inner surface of the front or back layer for adhesively attaching the front layer and back layer to each other. An opaque viewing layer is included on the front or back layer and an activation agent is provided on the other layer. One surface of the opaque viewing layer is viewable from the display region when the front and back layers are adhesively attached to each other. A dye that is substantially non-migrating through the opaque viewing layer, overlies the other surface of the opaque viewing layer. When the inner surfaces of the front and back layers are contacted with each other, the adhesive means adhesively attaches the front and back layers to each other and activates the activation agent. The activation agent migrates to the opaque viewing layer in a predetermined period of time to be absorbed therein. Such absorption activates the dye to enable it to migrate through the opaque viewing layer toward the other side causing an indication in the display region that the predetermined amount of time has expired.

Optionally, the activation agent contacts the dye to solubilize the dye to enable it to migrate through the opaque viewing layer. Preferably, however, the activating agent is a plasticizer that is absorbed into the polymeric opaque viewing layer. At a critical concentration of the plasticizer in the viewing layer, the dye is rapidly absorbed into the viewing layer, passing through the viewing layer to the other surface thereof where it becomes visible through the clear display region on, for example, the white background of the viewing layer.

BRIEF DESCRIPTION OF THE DRAWINGS

For a more complete understanding of the present invention, reference may be had to the following Detailed Description of the Invention considered in connection with the accompanying drawings, in which.

DETAILED DESCRIPTION OF THE INVENTION

Figure 1:
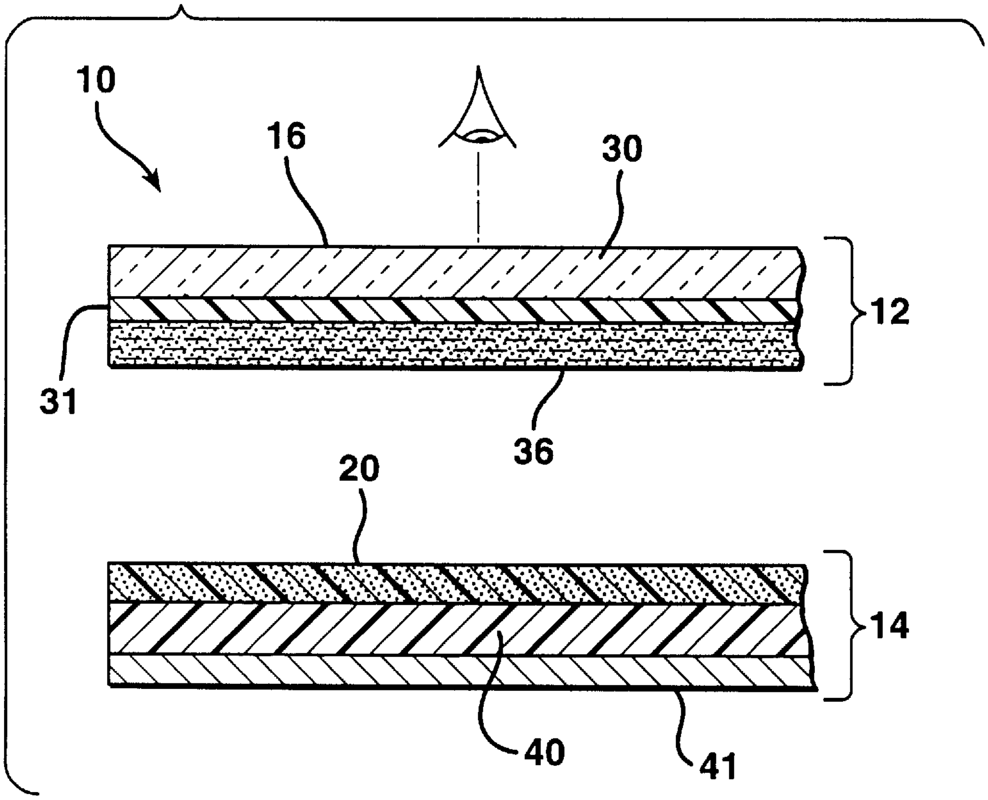
FIG. 1 is a cross-sectional view of a one embodiment of the time indicator of the present invention prior to activation.
Figure 5:
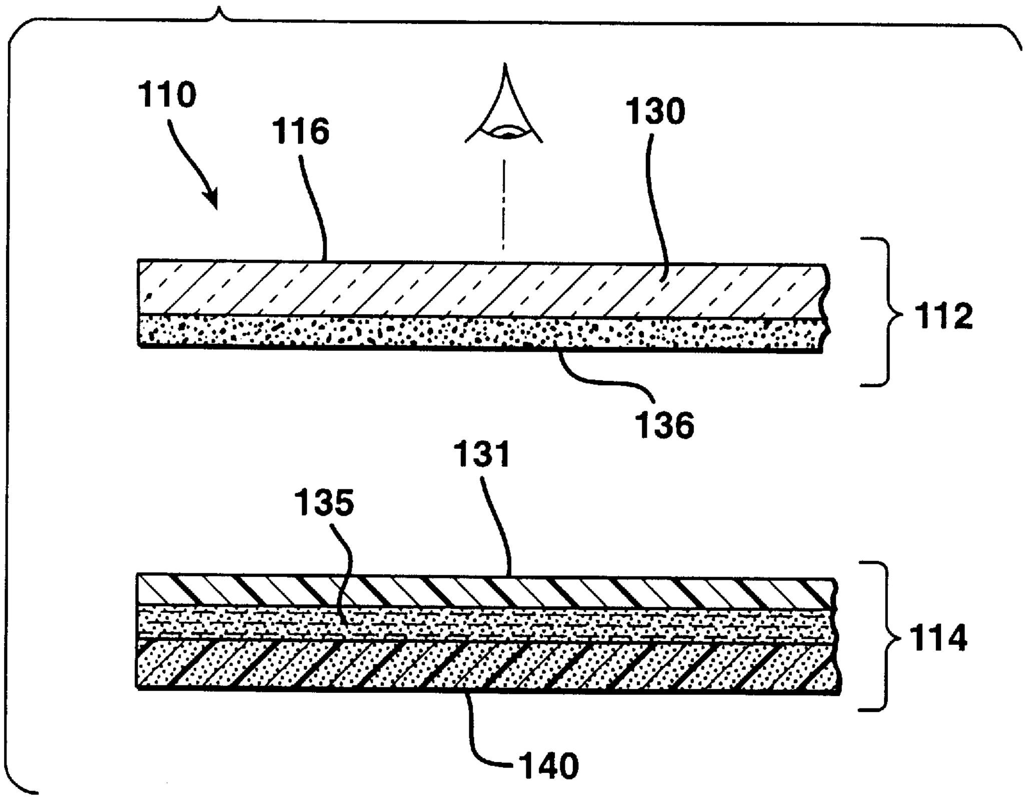
FIG. 5 is a cross-sectional view of another embodiment of the time indicator of the present invention prior to activation.

Referring to FIGS. 1 & 5, respectively, broadly generally the time indicator 10,110 includes a front layer 12, 112 and a back layer 14, 114, each having an inner and outer surface. The front layer 12, 112 has a display region 16, 116 on its outer surface. An adhesive means 36, 136 is provided on the inner surface of the front 12, 112 or back layer 14, 114 for adhesively attaching the front layer 12, 112 and back layer 14, 114 to each other.

An opaque viewing layer 31, 131 is included on the front 12, 112 or back layer 14, 114 and an activation agent is provided on the other layer 20, 136. One surface of the opaque viewing layer 31, 131 is viewable from the display region 16, 116 when the front layer 12, 112 and the back layer 14, 114 are adhesively attached to each other. A dye that is substantially non-migrating through the opaque viewing layer 31, 131, overlies the other surface of the opaque viewing layer in layers 36,135.

When the inner surfaces of the front and back layers are contacted with each other, the adhesive means 36, 136 adhesively attaches the front 12, 112 and back 14, 114 layers to each other and initiates the movement of the activation agent. The activation agent migrates to the opaque viewing layer 31, 131 in a predetermined period of time to be absorbed therein. Such absorption activates the dye to enable it to migrate through the opaque viewing layer toward the other side causing an indication in the display region that the predetermined period of time has expired. Optionally, the activation agent contacts the dye, for example, to solubilize the dye to enable it to migrate through the opaque viewing layer 31, 131.

Referring to the specific embodiment depicted in FIGS. 1–4, time indicator 10 includes a front layer 12 and a back layer 14. The front layer has a substantially transparent display layer 30, preferably a clear acetate or polyester film, that has an inner and outer surface. Transparent layer 30 preferably is of a sufficient thickness to provide mechanical support and rigidity to the front layer 12.

An opaque, e.g., white, viewing layer 31 overlies the inner surface of the display layer 30. An adhesive layer 36 overlies the opaque viewing layer 31. The adhesive layer 36 includes therein, admixed with the adhesive, a dye or ink. The dye is substantially non-migrating through the opaque viewing layer 31 prior to activation of the time indicator 10. The adhesive layer 36 is preferably a pressure sensitive adhesive layer.

Preferably the back part 14 of the time indicator 10 includes a support layer 40 having an inner and outer surface. An activation agent 20 is applied on the inner surface. The activation agent 20 can also be included as an integral part of the support layer 40. The support layer 40 may also have thereon an adhesive 41 for adhering the indicator 10 to a surface, e.g., the wearer's clothing.

When the inner surface of the back layer 14 is contacted with and overlies the adhesive layer 36, the adhesive layer 36 adhesively attaches the front and back layers 12, 14 to each other. Simultaneously, the activation agent in layer 20 is available to migrate through the adhesive layer 36 to the opaque viewing layer 31. After a predetermined period of time has elapsed, the absorption of the activation agent in the opaque viewing layer 31 activates the dye contained in the adhesive layer 36 to migrate through the opaque viewing layer 31 to cause an indication in the display layer or region 16 that the predetermined amount of time has elapsed.

The activation agent, for example, may contact the dye to solubilize it to enable the dye to migrate through the viewing layer 31. Alternatively, and preferably, the activation agent is absorbed in the viewing layer 31 to sufficiently change the properties of the viewing layer 31 to enable the dye to migrate therethrough. Preferably, this is accomplished by the use of a plasticizer which is absorbed into the polymeric viewing layer 31. At a critical concentration of the activation agent in the viewing layer 31, the dye is rapidly absorbed into the viewing layer 31. The dye thus becomes visible through the clear display region 16 contrasting with, for example, the white background of the viewing layer 31. The appearance of a color or image, signals the end of the predetermined time interval.

Preferably, the front and/or back parts 12,14 may each have a protective peel-away layer covering the adhesive layer 36 and/or activation region 20. When the badge is activated, these protective layers are peeled away and discarded.

Figure 2:
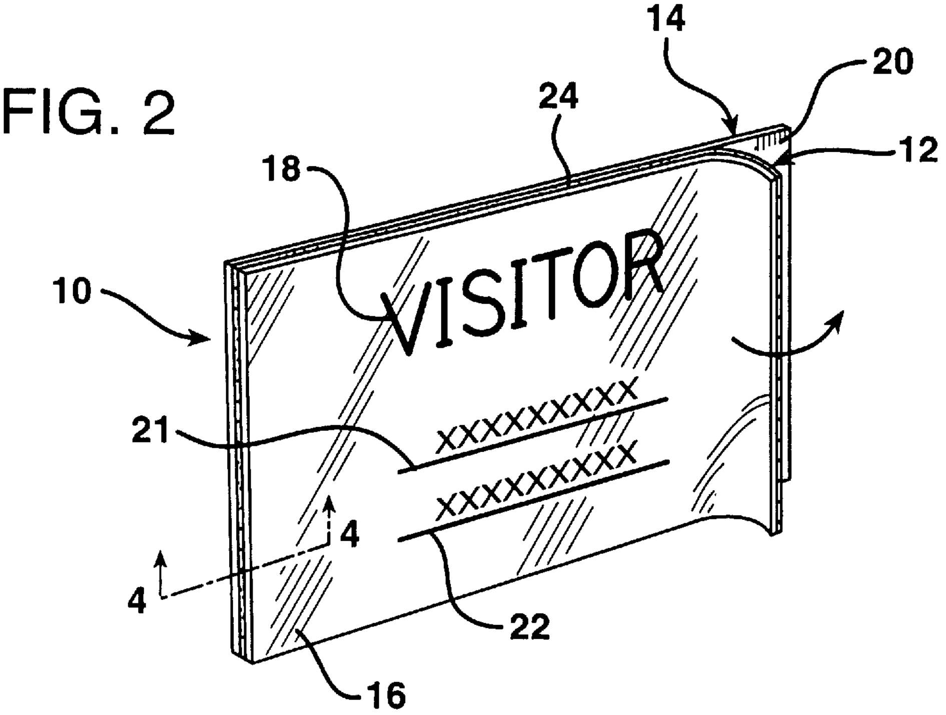
FIG. 2 is a perspective view of the time indicator of FIG. 1 in the process of being activated.
Figure 3:
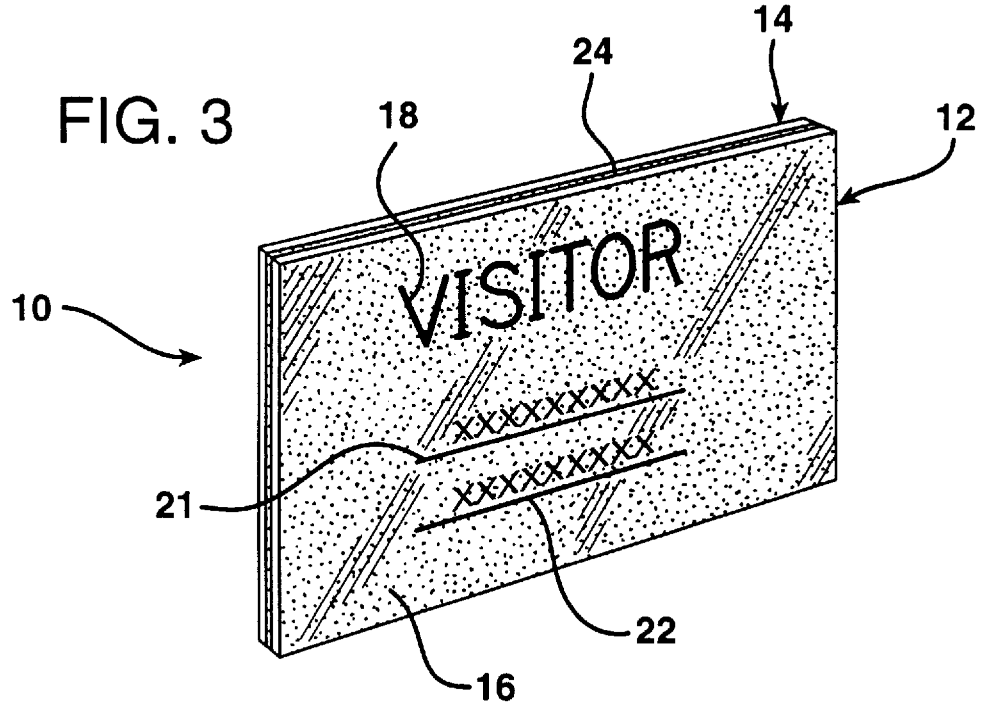
FIG. 3 is a perspective view of the time indicator badge of FIG. 1 after expiration thereof.
Figure 4:
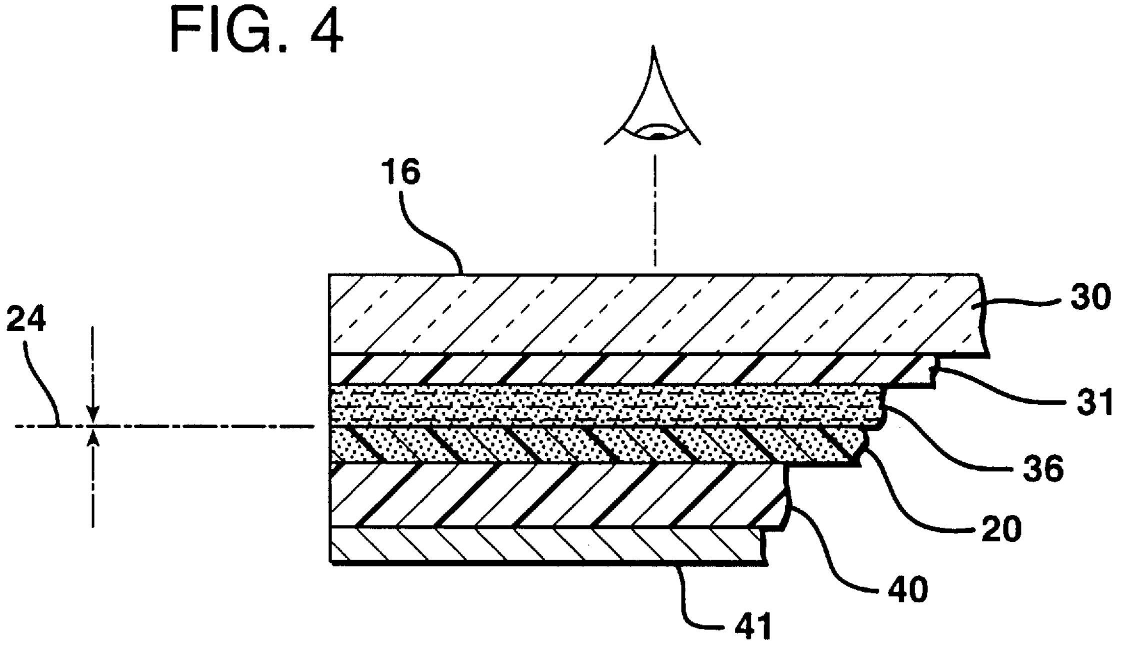
FIG. 4 is a cross-sectional view of the time indicator of this invention taken along line 4—4 of FIG. 2.

Referring to FIGS. 2 and 3, on the front part 12 of the time indicator badge 10 is a front print display surface 16, which has the word "VISITOR" or other such indicia printed thereon. It may include a visitor name line 21 upon which the security person can write the name of the visitor. The badge may also include other information such as provided at line 22.

FIG. 5 shows another embodiment of the invention. The time indicator 110 includes a front layer 112 and a back layer 114. The front layer 112 has a substantially transparent display layer 130 having an inner and outer surface. An adhesive layer 136 overlies the inner surface of the display layer 130 for adhesively attaching the front layer 112 to the back layer 114. The adhesive layer includes an activation agent admixed therein.

The back layer 114 comprises an opaque viewing layer 131 having an inner and outer surface. A dye 135 overlies the inner surface of the opaque viewing layer 131. The dye 135 is substantially non-migrating through the opaque viewing layer 131. A support layer 140 overlies the dye 135.

When the outer surface of the opaque viewing layer 131 is contacted with and overlies the adhesive layer 136, the adhesive layer 136 adhesively attaches the front and back layers 112, 114 to each other and allows the activation agent in the adhesive layer 136 to become absorbed in the opaque viewing layer 131 after a predetermined period of time. This absorption into the viewing layer activates the dye 135 to migrate through the opaque viewing layer 131 to cause an indication in the display layer 130 that the predetermined amount of time has elapsed.

The opaque viewing layer 31, 131 is preferably a thin, e.g., 1 mil thick polymeric film. Such a thin viewing layer provides a relatively short travel path for the dye or ink so that it can migrate through the layer 31, 131. This assists in preventing the dispersion of the dye and in producing a sharp color change, particularly because the dye or ink is in very high concentration adjacent to the opaque viewing layer 31, 131. The opaque viewing layer 31 is preferably a white vinyl film, although other colors and other type polymers may be used. Another preferred viewing layer material is a mixture of poly vinyl chloride (PVC) (Geon Resin 110×334) mixed with 10%–30% titanium dioxide.

The activation agent is typically an organic plasticizer, such as Plasthall P-550, Plasthall Trioctyl Trimelletate, Paraplex G-25 from C. P. Hall Company.

The "predetermined period of time" after which the indicator expires, may be varied and controlled, for example, by varying the thickness and composition of the opaque viewing layer 31, 131 and the concentration of the activation agent. The time may also be varied by variations in the adhesive layer 36, 136. For example, the layer 36 may have varying thicknesses and/or compositions to provide for differing predetermined times for the activating agent to traverse from the activation region 20 through the adhesive layer 36 to the viewing layer 31. Typically, however the time is controlled by the absorption rate of the activating agent into the viewing layer.

To control the migration of the activation agent, different activation agents can be used. Vastly different rates can be obtained with different agents. Accordingly, adjustments can be made to the time period that the time indicator is designed to indicate. If the plasticizer is highly polar and the layer in which it is held is also highly polar, the plasticizer will be released slowly therefrom. If the plasticizer activating agent is not polar and the layer in which it is held or to which it is applied is also polar, the activating agent will be released more rapidly, causing the concentration of the plasticizer in the viewing layer to increase rapidly, thus providing a short time interval to be indicated by the time indicator.

The time indicator of the present invention can be constructed of the following materials:

The display layer 30, 130: DuPont Mylar A, 2 mils (Dupont Corp., Wilmington Del.) or 2 mil polyester (ICI Films, Wilmington Del.)

The opaque viewing layer 31, 131: PVC with titanium dioxide or PVC Homopolymer Oxy200 from Oxichem, Dallas Tex., Geon Resin 110×334 with titanium dioxide, The Geon Company, Cleveland Ohio.

The adhesive layers 36, 136: Duro-Tak 6112 or Duro-Tak LS5068 from National Starch and Chemical Co., Bridgewater, N.J. Almost any adhesive which is receptive to the dyes and inks can be used. Preferred adhesives are from National Starch and Chemical Co. And H & N Chemical Co.

The activating agent: Monsanto HB-40, C. P. Hall Plasthall DIDP (Di isodecyl Phthalate).

The dye: Berncolors Print Scarlet 70021 or Compton Knowles Solvent Red Violet RH.

Preferred inks for use with this invention are from Gans Ink Company, Los Angeles, Calif. In particular, Pyroscript Sublimation Inks, e.g. Ink Nos. 57977, 57976; Heat Transfer Inks, Turn-A-Bout, Sunrise Process, Sunburst Process and Turn-A-Bout R. S. Series inks. Sublimation and heat transfer type inks are generally low molecular weight dyes that can bleed. Standard inks which do not bleed include particles, i.e., finely ground non-migrating solids (vis-vis molecules) which provide deep colors.

In a preferred embodiment of the indicator the dye is red and the viewing layer is an opaque (white) polystyrene barrier film which hides the dye. The dye may be printed as a light dot pattern, e.g., 10% or 20% tint, on the lower side of the film.

Preferably, the timing indicator of this invention is stable and has a shelf life at ambient temperature of at least 2 years. Additionally, it is desirable that the assembly and construction materials are relatively inexpensive so that the indicator is relatively inexpensive. Further, the components of the indicator should be flexible and foodsafe because of application to edible, pharmaceutical and other consumer products.

The materials used in construction of the indicator should have relatively low temperature sensitivity in order to minimize the time-temperature affect. Typically, the indicator will be used at normal room temperature where the average ambient temperature range will be 70° to 85° F., and refrigerator temperature where the range will be 40° to 45° F.

Importantly, the indicators of the present invention remain completely white (noncolored) throughout the entire timing process because no dye or ink is involved in the timing mechanism. The color change is very rapid and provides an immediate timing interval indication. Specifically, the timing process can be for weeks or months, e.g., one month, three months, one year, yet the complete color change from white to 100% color occurs within hours and possibly even minutes.

All known time indicators require the migration of the dye over a period of time to gradually bleed across or into a viewing surface to indicate the passage of the predetermined time. In the present invention the dye or ink is substantially non-migrating after activation and is only triggered to pass through the viewing surface after the migration of a non-dye/ink to the viewing surface. This provides a relatively instantaneous indication of the expiration of the time rather than the gradual indication provided by the known time indicators.

The time indicator of this invention has many uses, including, but not limited to: a self-timing sticker for visual validation of an access card; a safety sticker that develops warning words such as "Dangerous" after specific time intervals; a self-timing retail sticker that voids itself; a time temperature food spoilage indicator; an indicator sticker for biological industrial processes, laboratory experiments, field testing, etc.; where a clock or timer is impractical or too expensive; a service sticker that shows words such as "Service Required" after a service or preventative maintenance time interval; a property pass, luggage tag, or bar coding sticker that self-expires to prevent re-use; a shipping sticker that changes color to flag urgent or dated shipments that are overdue or about to be missed; an identification-admission bracelet that self-expires after a time interval; a ski ticket or entertainment park pass that self-expires; a toll book, bus or train pass, that develops the word "expired" after a specific time interval.

Having thus described my invention in detail, it is to be understood that the foregoing description is not intended to limit the spirit and scope thereof. What is desired to be protected by Letters Patent is set forth in the appended claims.

What is claimed is:

1. A time indicator comprising:

a front layer and a back layer, each layer having an inner and outer surface, the front layer having a display region on its outer surface;

an adhesive means on the inner surface of the front or back layer for adhesively attaching the inner surface of the front layer to the inner surface of the back layer;

a polymer opaque viewing layer on the front or back layer and an activation agent on the other of the front or back layer, wherein the activating agent is a plasticizer for the polymer opaque viewing layer;

one surface of the opaque viewing layer being viewable from the display region when the front and back layers are adhesively attached to each other;

a dye that is substantially non-migrating through the opaque viewing layer, overlying the other surface of the opaque viewing layer when the front and back layers are adhesively attached to each other;

wherein when the inner surfaces of the front and back layers are contacted with each other, the adhesive means adhesively attaches the front and back layers to each other and activates the activation agent to migrate to the opaque viewing layer in a predetermined period of time to thereby activate the opaque viewing layer to enable the viewing layer to absorb the dye into the viewing layer and migrate through the opaque viewing layer to cause an indication in the display region that the predetermined period of time has elapsed.

2. A time indicator comprising:

a front layer and a back layer;

the front layer comprising:

a substantially transparent display layer having an inner and outer surface;

a polymer opaque viewing layer overlying the inner surface of the display layer;

an adhesive layer overlying the opaque viewing layer for adhesively attaching the front layer to the back layer, the adhesive layer comprising a dye that is substantially non-migrating through the opaque viewing layer;

the back layer having an inner and outer surface and an activation agent on the inner surface, wherein the activating agent is a plasticizer for the polymer opaque viewing layer;

wherein when the inner surface of the back layer is contacted with and overlies the adhesive layer, the adhesive layer adhesively attaches the front and back layers to each other and activates the activation agent to migrate through the adhesive layer in a predetermined period of time to activate the opaque viewing layer to enable the viewing layer to absorb the dye into the viewing layer to thereby activate the dye to migrate through the opaque viewing layer to cause an indication in the display layer that the predetermined period of time has elapsed.

3. A time indicator comprising:

a front layer and a back layer;

the front layer comprising:

a substantially transparent display layer having an inner and outer surface;

an adhesive layer overlying the inner surface of the display layer for adhesively attaching the front layer to the back layer, the adhesive layer comprising an activation agent, wherein the activating agent is a plasticizer for the polymer opaque viewing layer;

the back layer comprising:

a polymer opaque viewing layer having an inner and outer surface;

a dye overlying the inner surface of the opaque viewing layer, wherein the dye is substantially non-migrating through the opaque viewing layer;

a support layer overlying the dye;

wherein when the outer surface of the opaque viewing layer is contacted with and overlies the adhesive layer, the adhesive layer adhesively attaches the front and back layers to each other and activates the activation agent to be absorbed in the opaque viewing layer to activate the opaque viewing layer to enable the viewing layer to absorb the dye into the viewing layer in a predetermined period of time to activate the dye to migrate through the opaque viewing layer to cause an indication in the display layer that the predetermined period of time has elapsed.

4. The indicator of claim 1, wherein the predetermined period of time is at least about one month.

5. The indicator of claim 1, wherein the predetermined period of time is at least about three months.

6. The indicator of claim 1, wherein the predetermined period of time is at least about one year.

7. The indicator of claim 1, wherein the indicator is a security badge.

* * * * *